US012792688B2

(12) United States Patent
Fishel et al.

(10) Patent No.: US 12,792,688 B2
(45) Date of Patent: Nov. 10, 2026

(54) VECTOR CIRCUIT WITH SCALAR OPERATIONS IN ACCELERATOR CIRCUIT FOR MATHEMATICAL OPERATIONS

(71) Applicant: Apple Inc., Cupertino, CA (US)

(72) Inventors: Liran Fishel, Raanana (IL); Danny Gal, Hod-Hasharon (IL); Nir Nissan, Atlit (IL); Etai Zaltsman, Ramat-Hasharon (IL)

(73) Assignee: APPLE INC., Cupertino, CA (US)

( * ) Notice: Subject to any disclaimer, the term of this patent is extended or adjusted under 35 U.S.C. 154(b) by 1273 days.

(21) Appl. No.: 17/675,369

(22) Filed: Feb. 18, 2022

(65) Prior Publication Data

US 2023/0267168 A1 Aug. 24, 2023

(51) Int. Cl.
*G06F 17/16* (2006.01)

(52) U.S. Cl.
CPC .................................... *G06F 17/16* (2013.01)

(58) Field of Classification Search
CPC ............... G06F 9/3001; G06F 9/30043; G06F 9/30036; G06F 17/16
See application file for complete search history.

(56) References Cited

U.S. PATENT DOCUMENTS

| | | | | |
|---|---|---|---|---|
| 10,558,599 | B2 | 2/2020 | Staudenmaier et al. | |
| 2018/0341495 | A1 * | 11/2018 | Culurciello | G06F 9/3001 |
| 2019/0079767 | A1 * | 3/2019 | Heinecke | G06F 9/3001 |
| 2020/0226203 | A1 | 7/2020 | George et al. | |
| 2021/0048991 | A1 | 2/2021 | Tanner et al. | |
| 2021/0182060 | A1 | 6/2021 | Moreira et al. | |
| 2023/0195471 | A1 * | 6/2023 | Millar | G06F 8/4441 712/22 |

* cited by examiner

*Primary Examiner* — Emily E Larocque
*Assistant Examiner* — Jerome Anthony Klosterman, II
(74) *Attorney, Agent, or Firm* — Sterne, Kessler, Goldstein & Fox P.L.L.C.

(57) ABSTRACT

Embodiments of the present disclosure relate to a vector circuit in an accelerator circuit for performing vector and scalar operations. The vector circuit reads a subset of instructions from an instruction memory, each instruction including an identification of at least a portion of a first vector and an identification of at least a portion of a second vector. The vector circuit further receives a portion of input data from a data memory corresponding to the subset of instructions. The vector circuit performs a respective operation in accordance with each instruction on at least one first element of the first vector and at least one second element of the second vector to generate at least one output element of an output vector. Each instruction indicates positions in respective vectors for the at least one first element, the at least one second element and the at least one output element.

20 Claims, 6 Drawing Sheets

VECTOR CIRCUIT WITH SCALAR OPERATIONS IN ACCELERATOR CIRCUIT FOR MATHEMATICAL OPERATIONS

BACKGROUND

1. Field of the Disclosure

The present disclosure relates to a circuit for performing mathematical operations, and more specifically to a vector circuit with scalar operations in an accelerator circuit for mathematical operations.

2. Description of the Related Arts

An artificial neural network (ANN) is a computing system or model that uses a collection of connected nodes to process input data. The ANN is typically organized into layers where different layers perform different types of transformation on their input. Extensions or variants of ANN such as convolution neural network (CNN), recurrent neural networks (RNN) and deep belief networks (DBN) have come to receive much attention. These computing systems or models often involve extensive computing operations including multiplication and accumulation. For example, CNN is a class of machine learning technique that primarily uses convolution between input data and kernel data, which can be decomposed into multiplication and accumulation operations.

Depending on the types of input data and operations to be performed, these machine learning systems or models can be configured differently. Such varying configuration would include, for example, pre-processing operations, the number of channels in input data, kernel data to be used, non-linear function to be applied to convolution result, and applying of various post-processing operations. Using a central processing unit (CPU) and its main memory to instantiate and execute machine learning systems or models of various configuration is relatively easy because such systems or models can be instantiated with mere updates to code. However, relying solely on the CPU for various operations of these machine learning systems or models would consume significant bandwidth of the CPU as well as increase the overall power consumption.

SUMMARY

Embodiments relate to an accelerator circuit for mathematical operations (e.g., linear algebra operations) that includes a vector circuit capable of executing instructions having formats that allow flexible operations on vector elements and use of vectors as scalars. The accelerator circuit further includes, among other components, an instruction memory storing the instructions, a data memory storing input data, and a scalar circuit. The vector circuit may read at least a subset of the instructions from the instruction memory, each instruction in the subset including a first identification of at least a portion of a first vector (e.g., identification of one or more elements of the first vector) and a second identification of at least a portion of a second vector (e.g., identification of one or more elements of the second vector). The vector circuit may further receive at least a portion of the input data from the data memory that corresponds to the subset of instructions. The vector circuit may perform a respective vector operation in accordance with each instruction in the subset using at least one first element of the first vector and at least one second element of the second vector from the received portion of input data to generate at least one output element of an output vector. Each instruction in the subset executed by the vector circuit may indicate positions in respective vectors for (i) the at least one first element, (ii) the at least one second element and (iii) the at least one output element.

BRIEF DESCRIPTION OF THE DRAWINGS

Figure

Figure 1:
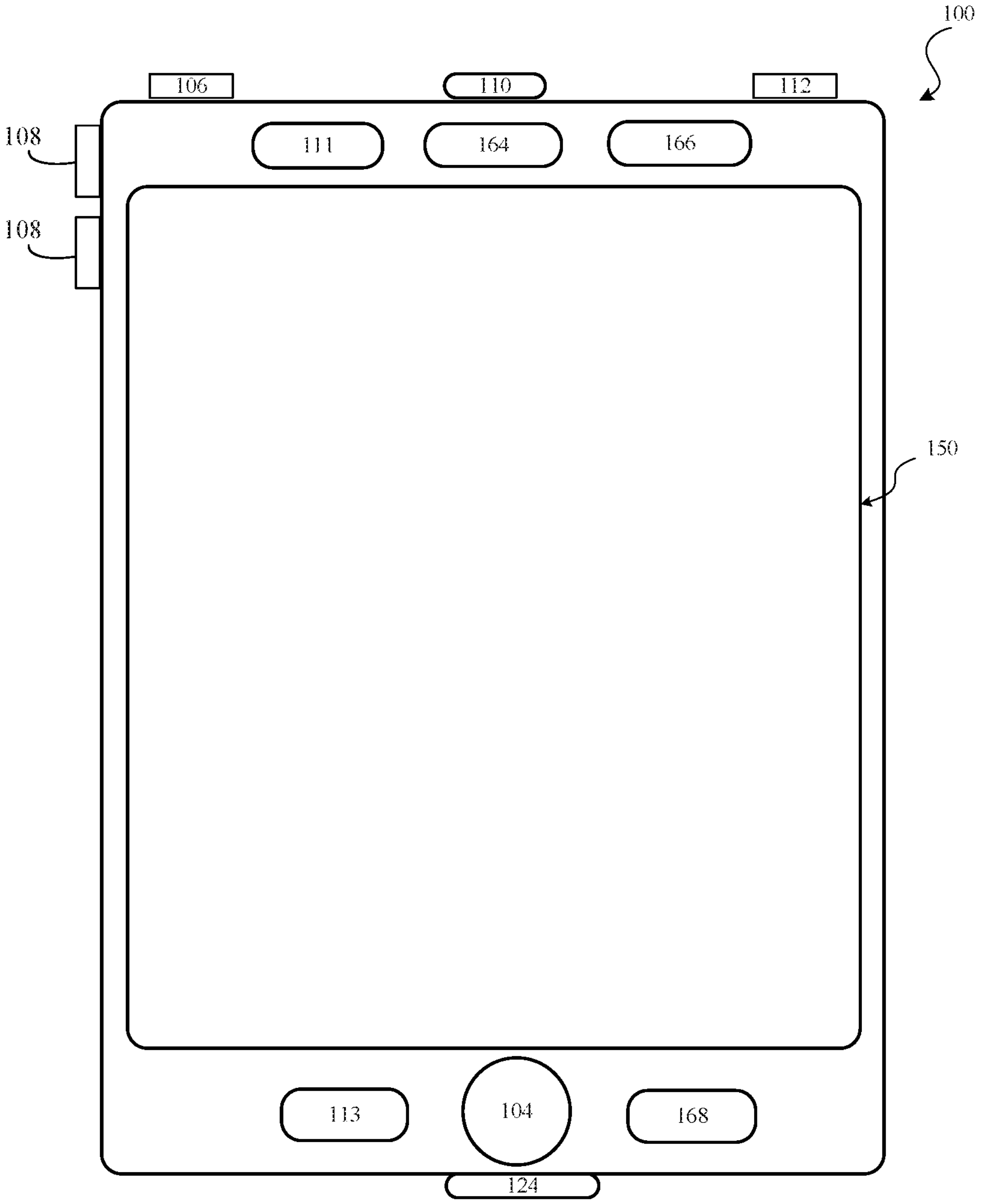
(FIG. 1 is a high-level diagram of an electronic device, according to one embodiment.

The figures depict, and the detail description describes, various non-limiting embodiments for purposes of illustration only.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, the described embodiments may be practiced without these specific details. In other instances, well-known methods, procedures, components, circuits, and networks have not been described in detail so as not to unnecessarily obscure aspects of the embodiments.

Embodiments of the present disclosure relate to an accelerator circuit for mathematical operations (e.g., linear algebra operations) that includes a vector circuit capable of executing instructions having formats that allow flexible operations (including scalar operations) on vector elements. The accelerator circuit further includes, among other components, an instruction memory storing the instructions (e.g., a program with a list of instructions), a data memory storing input data, and a scalar circuit coupled to the instruction memory and the data memory. The vector circuit may read at least a subset of the instructions from the instruction memory. The vector circuit may further receive at least a portion of the input data from the data memory that corresponds to the subset of instructions. The vector circuit may perform a respective vector operation in accordance with each instruction in the subset using the one or more elements of the first vector and the one or more elements of the second element to generate one or more output elements of an output vector. Each instruction in the subset executed by the vector circuit may include: (i) a first identification of one or more first elements of the first vector, (ii) an indication about position(s) of the one or more first elements in the first vector, (iii) a second identification of one or more second elements of the second vector, (iv) an indication about position(s) of the one or more second elements in the second vector, and (v) an indication about position(s) of the one or more output elements in the output vector.

Exemplary Electronic Device

Embodiments of electronic devices, user interfaces for such devices, and associated processes for using such devices are described. In some embodiments, the device is a portable communications device, such as a mobile telephone, that also contains other functions, such as personal digital assistant (PDA) and/or music player functions. Exemplary embodiments of portable multifunction devices include, without limitation, the iPhone®, iPod Touch®, Apple Watch®, and iPad® devices from Apple Inc. of Cupertino, California. Other portable electronic devices, such as wearables, laptops or tablet computers, are optionally used. In some embodiments, the device is not a portable communication device, but is a desktop computer or other computing device that is not designed for portable use. In some embodiments, the disclosed electronic device may include a touch-sensitive surface (e.g., a touch screen display and/or a touchpad). An example electronic device described below in conjunction with Figure (FIG. 1 (e.g., device 100) may include a touch-sensitive surface for receiving user input. The electronic device may also include one or more other physical user-interface devices, such as a physical keyboard, a mouse and/or a joystick.

FIG. 1 is a high-level diagram of an electronic device 100, according to one embodiment. Device 100 may include one or more physical buttons, such as a "home" or menu button 104. Menu button 104 is, for example, used to navigate to any application in a set of applications that are executed on device 100. In some embodiments, menu button 104 includes a fingerprint sensor that identifies a fingerprint on menu button 104. The fingerprint sensor may be used to determine whether a finger on menu button 104 has a fingerprint that matches a fingerprint stored for unlocking device 100. Alternatively, in some embodiments, menu button 104 is implemented as a soft key in a graphical user interface (GUI) displayed on a touch screen.

In some embodiments, device 100 includes touch screen 150, menu button 104, push button 106 for powering the device on/off and locking the device, volume adjustment buttons 108, Subscriber Identity Module (SIM) card slot 110, headset jack 112, and docking/charging external port 124. Push button 106 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 includes various components including, but not limited to, a memory (which may include one or more computer readable storage mediums), a memory controller, one or more central processing units (CPUs), a peripherals interface, an RF circuitry, an audio circuitry, speaker 111, microphone 113, input/output (I/O) subsystem, and other input or control devices. Device 100 may include one or more image sensors 164, one or more proximity sensors 166, and one or more accelerometers 168. Device 100 may include more than one type of image sensors 164. Each type may include more than one image sensor 164. For example, one type of image sensors 164 may be cameras and another type of image sensors 164 may be infrared sensors for facial recognition that is performed by one or more machine learning models stored in device 100. Device 100 may include components not shown in FIG. 1 such as an ambient light sensor, a dot projector and a flood illuminator that is to support facial recognition.

Device 100 is only one example of an electronic device, and device 100 may have more or fewer components than listed above, some of which may be combined into a component or have a different configuration or arrangement. The various components of device 100 listed above are embodied in hardware, software, firmware or a combination thereof, including one or more signal processing and/or application-specific integrated circuits (ASICs).

Figure 2:
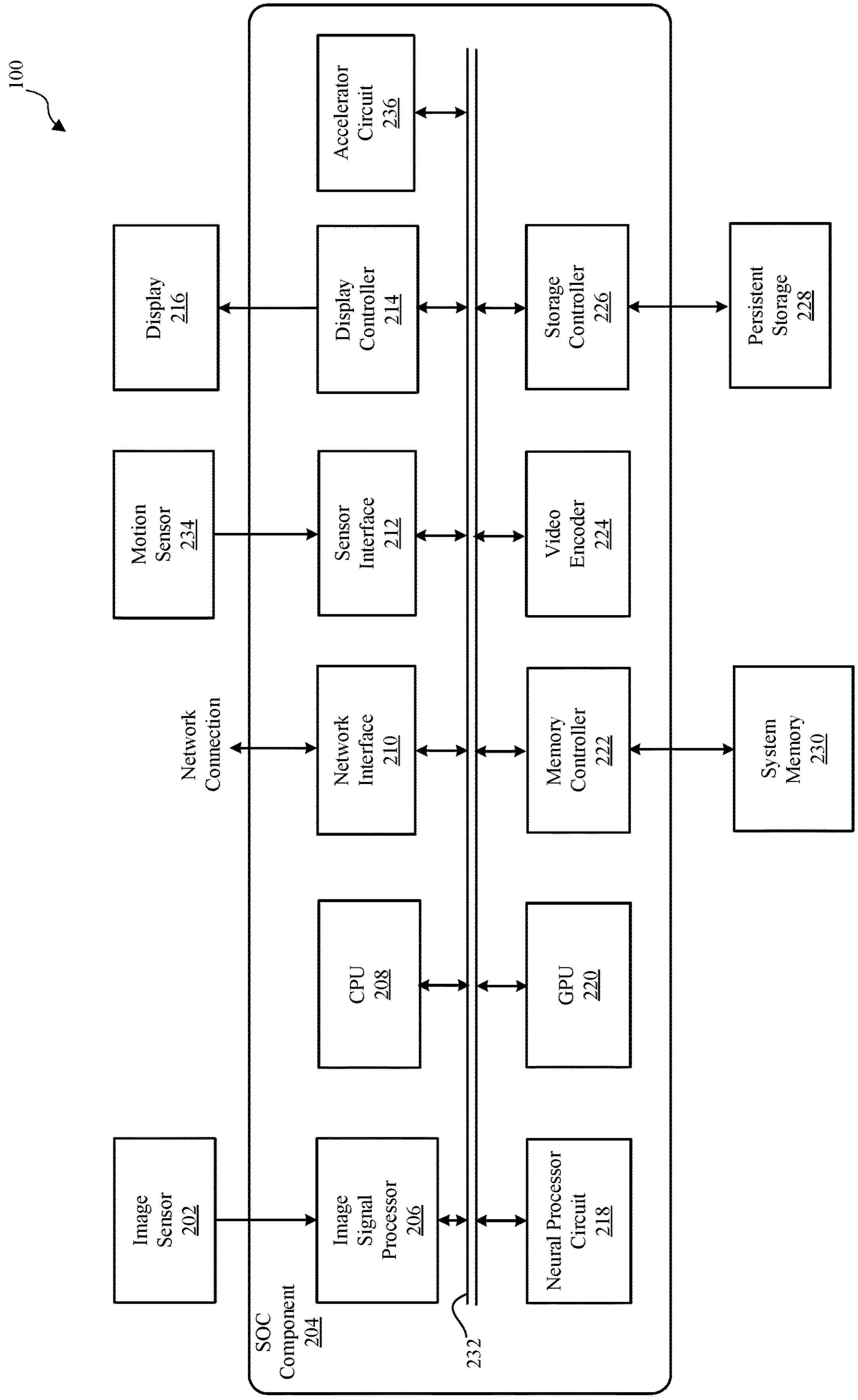
FIG. 2 is a block diagram illustrating components in the electronic device, according to one embodiment.

FIG. 2 is a block diagram illustrating components in device 100, according to one embodiment. Device 100 may perform various operations including implementing one or more machine learning models. For this and other purposes, device 100 may include, among other components, image sensors 202, a system-on-a chip (SOC) component 204, a system memory 230, a persistent storage (e.g., flash memory) 228, a motion sensor 234, and a display 216. The components as illustrated in FIG. 2 are merely illustrative. For example, device 100 may include other components (such as speaker or microphone) that are not illustrated in FIG. 2. Further, some components (such as motion sensor 234) may be omitted from device 100.

An image sensor 202 is a component for capturing image data and may be embodied, for example, as a complementary metal-oxide-semiconductor (CMOS) active-pixel sensor) a camera, video camera, or other devices. Image sensor 202 generates raw image data that is sent to SOC component 204 for further processing. In some embodiments, the image data processed by SOC component 204 is displayed on display 216, stored in system memory 230, persistent storage 228 or sent to a remote computing device via network connection. The raw image data generated by image sensor 202 may be in a Bayer color kernel array (CFA) pattern.

Motion sensor 234 is a component or a set of components for sensing motion of device 100. Motion sensor 234 may generate sensor signals indicative of orientation and/or acceleration of device 100. The sensor signals are sent to SOC component 204 for various operations such as turning on device 100 or rotating images displayed on display 216.

Display 216 is a component for displaying images as generated by SOC component 204. Display 216 may include, for example, liquid crystal display (LCD) device or an organic light-emitting diode (OLED) device. Based on data received from SOC component 204, display 116 may display various images, such as menus, selected operating parameters, images captured by image sensor 202 and processed by SOC component 204, and/or other information received from a user interface of device 100 (not shown).

System memory 230 is a component for storing instructions for execution by SOC component 204 and for storing data processed by SOC component 204. System memory 230 may be embodied as any type of memory including, for example, dynamic random access memory (DRAM), synchronous DRAM (SDRAM), double data rate (DDR, DDR2, DDR3, etc.) RAMBUS DRAM (RDRAM), static RAM (SRAM) or a combination thereof.

Persistent storage 228 is a component for storing data in a non-volatile manner. Persistent storage 228 retains data even when power is not available. Persistent storage 228 may be embodied as read-only memory (ROM), flash memory or other non-volatile random access memory devices. Persistent storage 228 stores an operating system of device 100 and various software applications. Persistent storage 228 may also store one or more machine learning models, such as regression models, random forest models, support vector machines (SVMs) such as kernel SVMs, and artificial neural networks (ANNs) such as convolutional network networks (CNNs), recurrent network networks (RNNs), autoencoders, and long short term memory (LSTM). A machine learning model may be an independent model that works with the neural processor circuit 218 and various software applications or sensors of device 100. A machine learning model may also be part of a software application. The machine learning models may perform various tasks such as facial recognition, image classification, object, concept, and information classification, speech recognition, machine translation, voice recognition, voice command recognition, text recognition, text and context analysis, other natural language processing, predictions, and recommendations.

Various machine learning models stored in device 100 may be fully trained, untrained, or partially trained to allow device 100 to reinforce or continue to train the machine learning models as device 100 is used. Operations of the machine learning models include various computation used in training the models and determining results in runtime using the models. For example, in one case, device 100 captures facial images of the user and uses the images to continue to improve a machine learning model that is used to lock or unlock the device 100.

SOC component 204 is embodied as one or more integrated circuit (IC) chip and performs various data processing processes. SOC component 204 may include, among other subcomponents, image signal processor (ISP) 206, a central processor unit (CPU) 208, a network interface 210, a sensor interface 212, a display controller 214, a neural processor circuit 218, a graphics processing unit (GPU) 220, a memory controller 222, a video encoder 224, a storage controller 226, an accelerator circuit 236, and a bus 232 connecting these subcomponents. SOC component 204 may include more or fewer subcomponents than those shown in FIG. 2.

ISP 206 is a circuit that performs various stages of an image processing pipeline. In some embodiments, ISP 206 may receive raw image data from image sensor 202, and process the raw image data into a form that is usable by other subcomponents of SOC component 204 or components of device 100. ISP 206 may perform various image-manipulation operations such as image translation operations, horizontal and vertical scaling, color space conversion and/or image stabilization transformations.

CPU 208 may be embodied using any suitable instruction set architecture and may be configured to execute instructions defined in that instruction set architecture. CPU 208 may be general-purpose or embedded processors using any of a variety of instruction set architectures (ISAs), such as the x86, PowerPC, SPARC, RISC, ARM or MIPS ISAs, or any other suitable ISA. Although a single CPU is illustrated in FIG. 2, SOC component 204 may include multiple CPUs. In multiprocessor systems, each of the CPUs may commonly, but not necessarily, implement the same ISA.

GPU 220 is graphics processing circuitry for performing graphical data. For example, GPU 220 may render objects to be displayed into a frame buffer (e.g., one that includes pixel data for an entire frame). GPU 220 may include one or more graphics processors that may execute graphics software to perform a part or all of the graphics operation, or hardware acceleration of certain graphics operations.

Neural processor circuit 218 is a circuit that performs various machine learning operations based on computation including multiplication, addition, and accumulation. Such computation may be arranged to perform, for example, various types of tensor multiplications such as tensor product and convolution of input data and kernel data. Neural processor circuit 218 is a configurable circuit that performs these operations in a fast and power-efficient manner while relieving CPU 208 of resource-intensive operations associated with neural network operations. Neural processor circuit 218 may receive the input data from sensor interface 212, ISP 206, persistent storage 228, system memory 230 or other sources such as network interface 210 or GPU 220. The output of neural processor circuit 218 may be provided to various components of device 100 such as ISP 206, system memory 230, CPU 208 or accelerator circuit 236 for various operations.

Accelerator circuit 236 is a circuit that performs various mathematical operations (e.g., linear algebra operations) based on computation including multiplication, division, addition, subtraction, square root operation, accumulation, or some other mathematical operations. Such computation may be arranged to perform, for example, various types of vector operations such as vector addition, vector subtraction, vector multiplication, and vector scaling. Accelerator circuit 236 may be implemented as, e.g., a linear algebra accelerator circuit for accelerating linear algebra operations or a vector processor for accelerating various operations on elements of vectors. As used herein, the term "vector" is defined broadly to include one-dimensional arrays, two-dimensional arrays (i.e., matrices) and arrays having more than two dimensions (i.e., tensors). Accelerator circuit 236 is a configurable circuit that performs operations in a fast and power-efficient manner while relieving CPU 208 of resource-intensive operations (e.g., linear algebra operations). Accelerator circuit 236 may be configured as a single instruction multiple data (SIMD) processor. Accelerator circuit 236 may receive the input data from sensor interface 212, ISP 206, persistent storage 228, system memory 230, neural processor circuit 218 or other sources such as network interface 210 or GPU 220. The output of accelerator circuit 236 may be provided to various components of device 100 such as ISP 206, system memory 230, CPU 208 and/or neural processor circuit 218 for various operations. In some embodiments, instead of being a stand-alone circuit, accelerator circuit 236 is integrated into ISP 206, neural processor circuit 218 or some other component of device 100. The structure and operations of accelerator circuit 236 will be discussed in further detail below with reference to FIG. 3.

Network interface 210 is a subcomponent that enables data to be exchanged between devices 100 and other devices via one or more networks (e.g., carrier or agent devices). For example, video or other image data may be received from other devices via network interface 210 and be stored in system memory 230 for subsequent processing (e.g., via a back-end interface to ISP 206) and display. The networks may include, but are not limited to, Local Area Networks (LANs) (e.g., an Ethernet or corporate network) and Wide Area Networks (WANs). The image data received via network interface 210 may undergo image processing processes by ISP 206.

Sensor interface 212 is circuitry for interfacing with motion sensor 234. Sensor interface 212 receives sensor information from motion sensor 234 and processes the sensor information to determine the orientation or movement of device 100.

Display controller 214 is circuitry for sending image data to be displayed on display 216. Display controller 214 receives the image data from ISP 206, CPU 208, graphic processor or system memory 230 and processes the image data into a format suitable for display on display 216.

Memory controller 222 is circuitry for communicating with system memory 230. Memory controller 222 may read data from system memory 230 for processing by ISP 206, CPU 208, GPU 220 or other subcomponents of SOC component 204. Memory controller 222 may also write data to system memory 230 received from various subcomponents of SOC component 204.

Video encoder 224 is hardware, software, firmware or a combination thereof for encoding video data into a format suitable for storing in persistent storage 228 or for passing the data to network interface 210 for transmission over a network to another device.

In some embodiments, one or more subcomponents of SOC component 204 or some functionality of these subcomponents may be performed by software components executed on neural processor circuit 218, ISP 206, CPU 208, GPU 220 or accelerator circuit 236. Such software components may be stored in system memory 230, persistent storage 228 or another device communicating with device 100 via network interface 210.

Example Neural Processor Circuit

Neural processor circuit 218 is a programmable circuit that performs machine learning operations on the input data of neural processor circuit 218. Machine learning operations may include different computations for training of a machine learning model and for performing inference or prediction based on the trained machine learning model.

Taking an example of a CNN as the machine learning model, training of the CNN may include forward propagation and backpropagation. A neural network may include an input layer, an output layer, and one or more intermediate layers that may be referred to as hidden layers. Each layer may include one or more nodes, which may be fully or partially connected to other nodes in adjacent layers. In forward propagation, the neural network performs computation in the forward direction based on outputs of a preceding layer. The operation of a node may be defined by one or more functions. The functions that define the operation of a node may include various computation operation such as convolution of data with one or more kernels, pooling of layers, tensor multiplication, etc. The functions may also include an activation function that adjusts the weight of the output of the node. Nodes in different layers may be associated with different functions. For example, a CNN may include one or more convolutional layers that are mixed with pooling layers and are followed by one or more fully connected layers.

Each of the functions, including kernels, in a machine learning model may be associated with different coefficients that are adjustable during training. In addition, some of the nodes in a neural network each may also be associated with an activation function that decides the weight of the output of the node in a forward propagation. Common activation functions may include step functions, linear functions, sigmoid functions, hyperbolic tangent functions (tanh), and rectified linear unit functions (ReLU). After a batch of data of training samples passes through a neural network in the forward propagation, the results may be compared to the training labels of the training samples to compute the network's loss function, which represents the performance of the network. In turn, the neural network performs backpropagation by using coordinate descent such as stochastic coordinate descent (SGD) to adjust the coefficients in various functions to improve the value of the loss function.

In training, device 100 may use neural processor circuit 218 to perform all or some of the operations in the forward propagation and backpropagation. Multiple rounds of forward propagation and backpropagation may be performed by neural processor circuit 218, solely or in coordination with other processors such as CPU 208, GPU 220, ISP 206, and accelerator circuit 236. Training may be completed when the loss function no longer improves (e.g., the machine learning model has converged) or after a predetermined number of rounds for a particular set of training samples. As device 100 is used, device 100 may continue to collect additional training samples for the neural network.

For prediction or inference, device 100 may receive one or more input samples. Neural processor circuit 218 may take the input samples to perform forward propagation to determine one or more results. The input samples may be images, speeches, text files, sensor data, or other data.

Data and functions (e.g., input data, kernels, functions, layers outputs, gradient data) in machine learning may be saved and represented by one or more tensors. Common operations related to training and runtime of a machine learning model may include tensor product, tensor transpose, tensor elementwise operation, convolution, application of an activation function, automatic differentiation to determine gradient, statistics and aggregation of values in tensors (e.g., average, variance, standard deviation), tensor rank and size manipulation, etc.

While the training and runtime of a neural network is discussed as an example, neural processor circuit 218 may also be used for the operations of other types of machine learning models, such as a kernel SVM.

Example Accelerator Circuit

Figure 3:
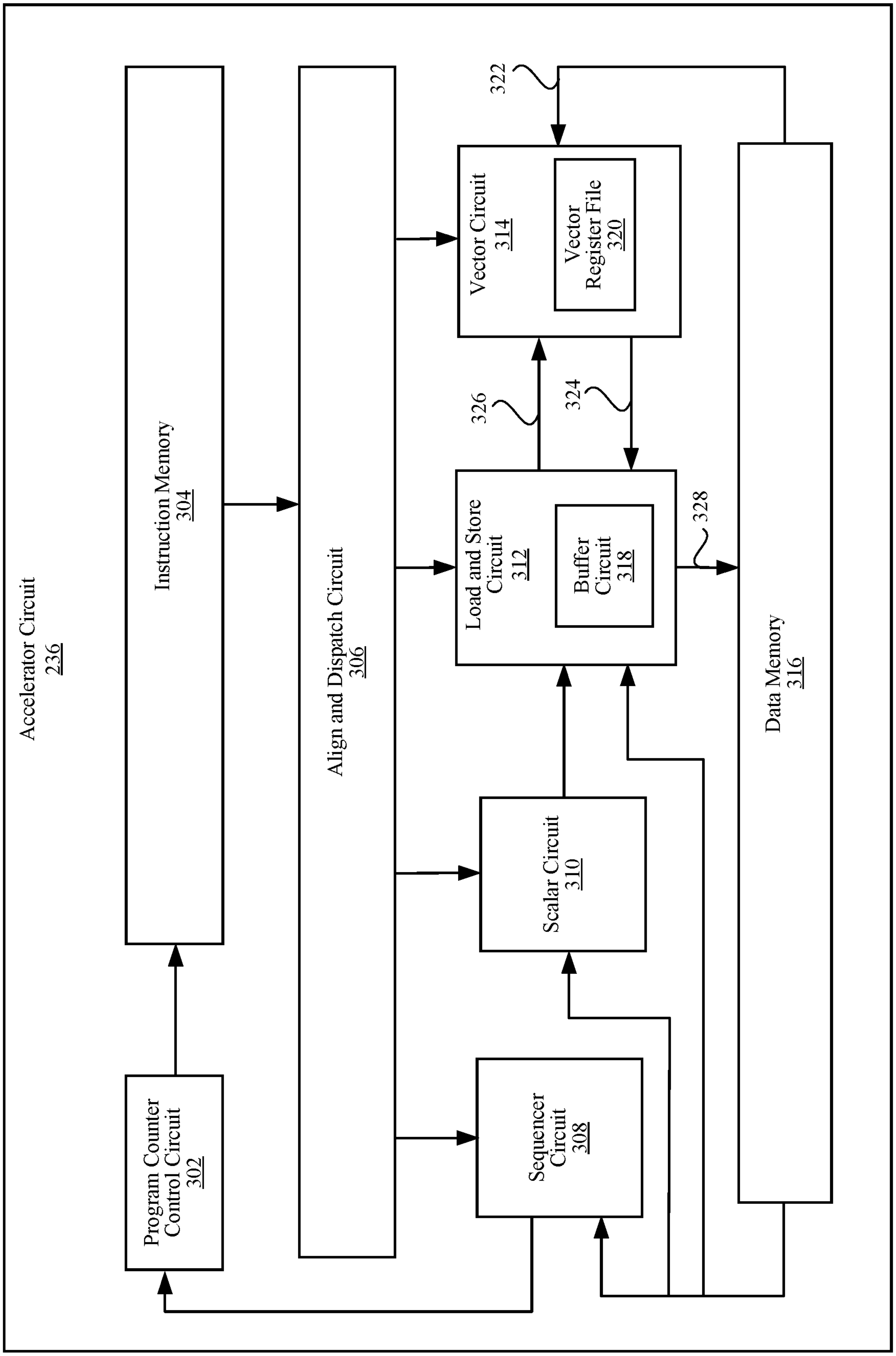
FIG. 3 is a block diagram illustrating an accelerator circuit, according to one embodiment.

FIG. 3 is a block diagram illustrating an example accelerator circuit 236, according to one embodiment. Accelerator circuit 236 includes a program counter control circuit 302, an instruction memory 304, an align and dispatch circuit 306, a sequencer circuit 308, a scalar circuit 310, a load and store circuit 312, a vector circuit 314 with a vector register file 320, and a data memory 316. Accelerator circuit 236 may include fewer or additional components not illustrated in FIG. 3.

Program counter control circuit 302 controls a program counter register pointing to an instruction packet in instruction memory 304 that is next for execution in a pipeline of accelerator circuit 236. An instruction packet may include a set of instructions that can be stored at a same address in instruction memory 304. Once an instruction packet is read from instruction memory 304, some or all of the instructions from the instruction packet may be executed in parallel by one or more components of accelerator circuit 236.

Align and dispatch circuit 306 receives an instruction packet from instruction memory 304. Align and dispatch circuit 306 may identify the received instruction packet and align the received instruction packet for dispatching individual instructions within the instruction packet to one or more components of accelerator circuit 236 (e.g., sequencer circuit 308, scalar circuit 310, load and store circuit 312, and/or vector circuit 314).

Sequencer circuit 308 manages a pipeline progress of instructions within accelerator circuit 236, an operation of program counter control circuit 302, instruction branches, access of instruction memory 304, and decoding of an instruction packet read from instruction memory 304.

Scalar circuit 310 may provide single integer execution pipeline including arithmetic, logic and bit manipulation operations. Scalar circuit 310 may further provide one or two stage execution for short latencies between sequential instructions. Scalar circuit 310 may also provide conditional execution for all instructions.

Load and store circuit 312 may load data from data memory 316, and store data (e.g., data generated by scalar circuit 310 and/or vector circuit 314) back to data memory 316. Load and store circuit 312 may include a store buffer 318 for data storage, which increases store throughput and minimizes contention with data loads from data memory 316.

Data memory 316 stores input data received from, e.g., sensor interface 212, ISP 206, persistent storage 228, system memory 230, neural processor circuit 218 or other sources such as network interface 210 or GPU 220. Data memory 316 further stores data that are saved in buffer circuit 318 previously generated by, e.g., scalar circuit 310 and/or vector circuit 314.

Vector circuit 314 may perform mathematical operations (e.g., linear algebra operations) on elements of vectors, e.g., as part of linear filtering. The mathematical operations performed at vector circuit 314 may include, e.g., multiply-accumulate operations, division operations, scaling operations, subtraction operations, square root operations, some other mathematical operation, or combination thereof. Each operation performed at vector circuit 314 may be performed in accordance with a corresponding instruction read from instruction memory 304 and decoded at vector circuit 314. Each operation performed at vector circuit 314 is broadly referred to herein as "vector operation", and includes any operation (e.g., linear algebra operation) performed between, e.g., at least one element of a first vector and at least one element of a second vector to generate at least one corresponding element of an output vector (e.g., output vector 324).

Output vector 324 generated by vector circuit 314 may be stored in buffer circuit 318 within load and store circuit 312. Output vector 324 may be stored in buffer circuit 318 together with one or more other output vectors 324 previously generated at vector circuit 314. At some predetermined operational cycle (e.g., clock cycle) of accelerator circuit 236, one or more elements of output vector 324 stored in buffer circuit 318 may be passed as input data 326 back into vector circuit 314 for further processing. Additionally, or alternatively, one or more output vectors 324 stored in buffer circuit 318 may be written into data memory 316 as output data 330. In one or more embodiments, one or more elements of output vector 324 generated by each vector operation performed at vector circuit 314 may be stored at vector register file 320 for further processing at vector circuit 314.

Example Instruction Formats for Vector Circuit

Figure 4A:
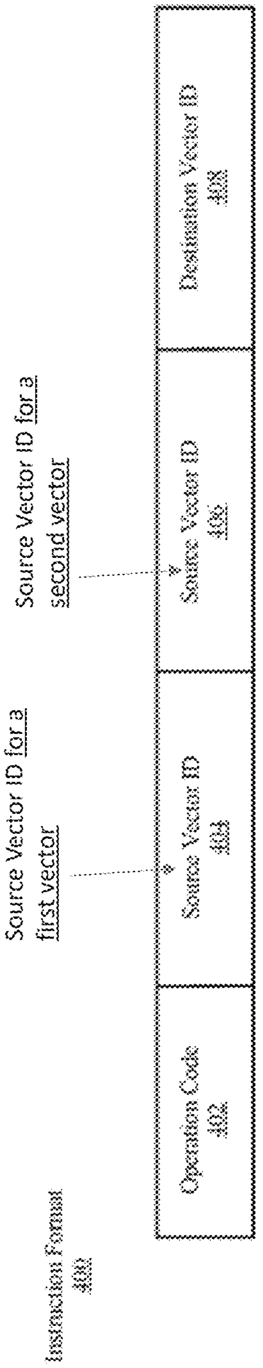
FIG. 4A is a first example format of an instruction for a vector circuit in an accelerator circuit, according to one embodiment.

The corresponding instruction read from instruction memory 304 and decoded for execution at vector circuit 314 may have a format as shown, e.g., in FIG. 4A. FIG. 4A illustrates an example instruction format 400 of an instruction for vector circuit 314, according to one embodiment. An instruction having instruction format 400 may be part of an instruction packet stored at a particular address in instruction memory 304 along with other instructions of the instruction packet. Instruction format 400 includes a field for an operation code 402, a field for a source vector identifier (ID) 404, a field for a source vector ID 406, and a field for a destination vector ID 408. Instruction format 400 may include fewer or additional fields not illustrated in FIG. 4A.

Operation code 402 may be a set of bits defining a vector operation to be performed at vector circuit 314. In one or more embodiments, vector circuit 314 decodes operation code 402 in order to initiate the vector operation. A vector operation identified by operation code 402 (e.g., after decoding) may be any mathematical operation performed on one or more elements of a first vector as indicated by source vector ID 404 and one or more elements of a second vector as indicated by source vector ID 406.

Source vector ID 404 may include an identification of at least a portion of a first vector for the vector operation identified by operation code 402, e.g., information about one or more positions of one or more elements in the first vector dedicated for the vector operation. Source vector ID 404 may further include an identification of a location of the portion of the first vector in accelerator circuit 236. The location of the portion of the first vector in accelerator circuit 236 may be an address in data memory 316. In such case, vector circuit 314 may receive (e.g., at vector register file 320) the portion of the first vector from data memory 316 as input data 322. Alternatively, the location of the portion of the first vector in accelerator circuit 236 may be buffer circuit 318 (e.g., received at vector circuit as input data 326), vector register file 320, or some other location in accelerator circuit 236.

Similarly, source vector ID 406 may include an identification of at least a portion of a second vector for the vector operation identified by operation code 402, e.g., information about one or more positions of one or more elements in the second vector dedicated for the vector operation. Source vector ID 406 may further include an identification of a location of the portion of the second vector in accelerator circuit 236. The location of the portion of the second vector in accelerator circuit 236 may be an address in data memory 316. In such case, vector circuit 314 may receive (e.g., at vector register file 320) the portion of the second vector from data memory 316 as input data 322. Alternatively, the location of the portion of the second vector in accelerator circuit 236 may be buffer circuit 318 (e.g., received at vector circuit as input data 326), vector register file 320, or some other location in accelerator circuit 236.

Destination vector ID 408 may include an identification of at least a portion of an output vector generated as a result of the vector operation identified by operation code 402, e.g., information about one or more positions of one or more elements in the output vector. Destination vector ID 408 may further include an identification of a storage location in accelerator circuit 236 for the one or more elements of the output vector. The storage location may be a location in data memory 316, buffer circuit 318, vector register file 320, or some other location in accelerator circuit 236. The one or more elements of the output vector may be output from vector circuit 314 as output data 324 for storage into buffer circuit 318 and/or storage in data memory 316 as output data 328. Thus, vector circuit 314 may perform a vector operation as identified by operation code 402 on at least one first element of the first vector as identified by source vector ID 404 and at least one second element of the second vector as identified by source vector ID 406 to generate at least one corresponding output element of the output vector (e.g., output vector 324) as identified by destination vector ID 408.

Figure 4B:
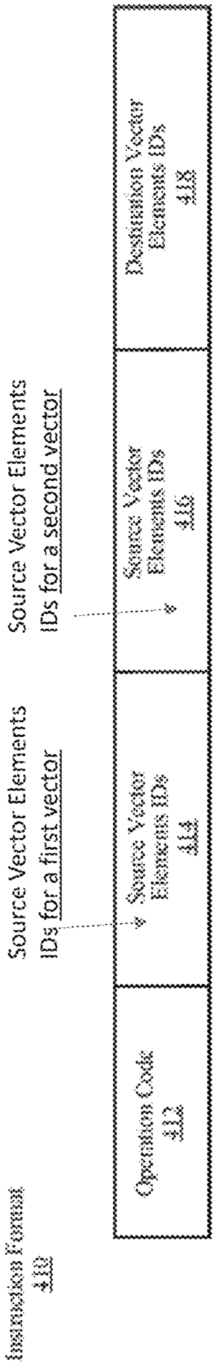
FIG. 4B is a second example format of an instruction for the vector circuit, according to one embodiment.

FIG. 4B illustrates an example instruction format 410 of an instruction for vector circuit 314, according to one embodiment. Instruction formal 410 may be a version of instruction format 400 in FIG. 4A. Instruction format 410 includes a field for an operation code 412, a field for source vector elements IDs 414, a field for source vector elements IDs 416, and a field for destination vector elements IDs 418. Instruction format 410 may include fewer or additional fields not illustrated in FIG. 4B.

Operation code 412 may be a set of bits defining a vector operation to be performed at vector circuit 314, which may be decoded at vector circuit 314 in order to initiate the vector operation. The vector operation identified by operation code 412 may be any mathematical operation performed on a first array of elements of a first vector as indicated by source vector elements IDs 414 and a second array of elements of a second vector as indicated by source vector elements IDs 416.

Source vector elements IDs 414 may include identifications of a set of positions in a first vector for a first array of elements used for the vector operation identified by operation code 412. The field for source vector elements IDs 414 may further include an identification of a location of the first array of elements in accelerator circuit 236, e.g., an address in data memory 316, buffer circuit 318, vector register file 320, or some other location in accelerator circuit 236.

Source vector elements IDs 416 may include identifications of a set of positions in a second vector for a second array of elements used for the vector operation identified by operation code 412. The field for source vector elements IDs 416 may further include an identification of a location of the second array of elements in accelerator circuit 236, e.g., an address in data memory 316, buffer circuit 318, vector register file 320, or some other location in accelerator circuit 236.

Destination vector elements IDs 418 may include identifications of a set of positions in an output vector for an array of output elements generated as a results of the vector operation identified by operation code 412. The field for destination vector elements IDs 418 may further include an identification of a storage location for the array of output elements in accelerator circuit 236, e.g., a location in data memory 316, buffer circuit 318, vector register file 320, or some other location in accelerator circuit 236. Thus, vector circuit 314 may perform a vector operation as identified by operation code 412 on the first array of elements of the first vector as identified by source vector elements IDs 414 and the second array of elements of the second vector as identified by source vector elements IDs 416 to generate the array of output elements of the output vector (e.g., output vector 324) as identified by destination vector elements IDs 418. Instruction format 410 allows a vector operation to be performed at vector circuit 314 on any subset of elements of two vectors and generate corresponding output elements of the output vector that can be any subset of elements in an output vector.

Figure 4C:
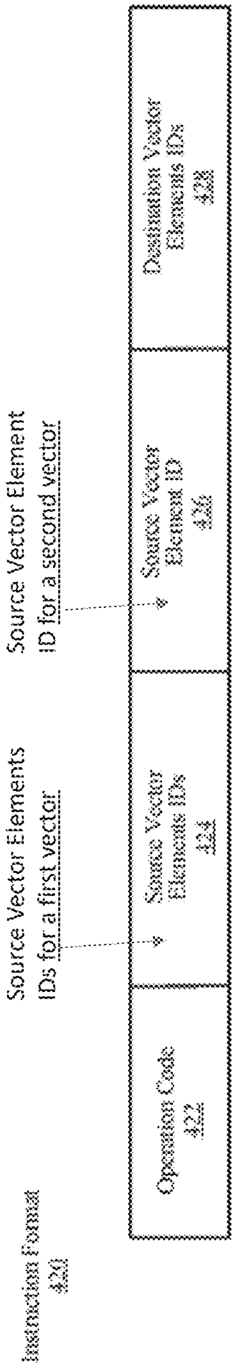
FIG. 4C is a third example format of an instruction for the vector circuit, according to one embodiment.

FIG. 4C illustrates an example instruction format 420 of an instruction for vector circuit 314, according to one embodiment. Instruction formal 420 may be a version of instruction format 400 in FIG. 4A. Instruction format 420 includes a field for an operation code 422, a field for source vector elements IDs 424, a field for a source vector element ID 426, and a field for destination vector elements IDs 428. Instruction format 420 may include fewer or additional fields not illustrated in FIG. 4C.

Operation code 422 may be a set of bits defining a vector operation to be performed at vector circuit 314, which may be decoded at vector circuit 314 in order to initiate the vector operation. The vector operation identified by operation code 422 may be any mathematical operation performed on an array of elements of a first vector as indicated by source vector elements IDs 424 and a single element of a second vector as indicated by source vector element ID 426.

Source vector elements IDs 424 may include identifications of a set of positions in a first vector for the array of elements used for the vector operation identified by operation code 422. The field for source vector elements IDs 424 may further include an identification of a location of the array of elements of the first vector in accelerator circuit 236, e.g., an address in data memory 316, buffer circuit 318, vector register file 320, or some other location in accelerator circuit 236.

Source vector element ID 426 may include an identification of a position in the second vector for the single element of the second vector used for the vector operation identified by operation code 422. The field for source vector element ID 426 may further include an identification of a location of the element of the second vector in accelerator circuit 236, e.g., an address in data memory 316, buffer circuit 318, vector register file 320, or some other location in accelerator circuit 236.

Destination vector elements IDs 428 may include identifications of a set of positions in an output vector for an array of output elements generated as a results of the vector operation identified by operation code 422. The field for destination vector elements IDs 428 may further include an identification of a storage location in accelerator circuit 236 for the array of output elements, e.g., a location in data memory 316, buffer circuit 318, vector register file 320, or some other location in accelerator circuit 236. Thus, vector circuit 314 may perform a vector operation as identified by operation code 422 on the array of elements of the first vector as identified by source vector elements IDs 424 and the single element of the second vector as identified by source vector element ID 426 to generate the array of output elements of the output vector (e.g., output vector 324) as identified by destination vector elements IDs 428. Instruction format 420 allows the use of second vector as a scalar, and the vector operation performed at vector circuit 314 as identified by operation code 422 may represent a scalar operation (e.g., scaling operation) performed on any subset of elements of the first vector to generate any subset of elements of the output vector. Furthermore, the use of instruction format 420 increases a number of scaler registers in accelerator circuit 236.

Figure 4D:
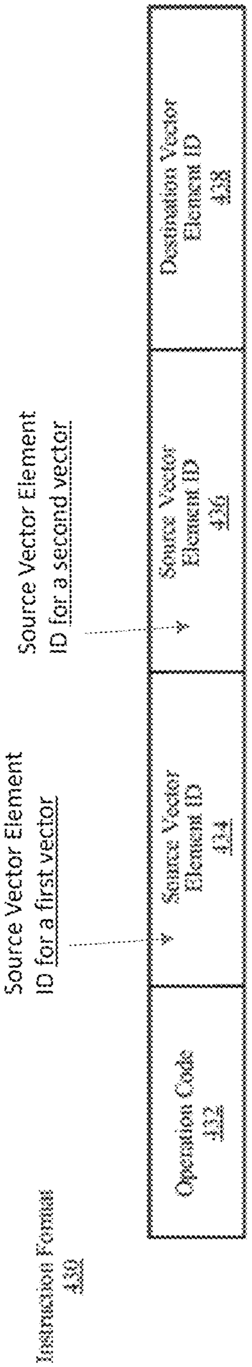
FIG. 4D is a fourth example format of an instruction for the vector circuit, according to one embodiment.

FIG. 4D illustrates an example instruction format 430 of an instruction for vector circuit 314, according to one embodiment. Instruction formal 430 may be a version of instruction format 400 in FIG. 4A. Instruction format 430 includes a field for an operation code 432, a field for a source vector element ID 434, a field for a source vector element ID 436, and a field for a destination vector element ID 438. Instruction format 430 may include fewer or additional fields not illustrated in FIG. 4D.

Operation code 432 may be a set of bits defining a vector operation to be performed at vector circuit 314, which may be decoded at vector circuit 314 in order to initiate the vector operation. The vector operation identified by operation code 432 may be any mathematical operation performed on a single element of a first vector as indicated by source vector element ID 434 and a single element of a second vector as indicated by source vector element ID 436.

Source vector element ID 434 may include an identification of a position in a first vector for the single element of the first vector used for the vector operation identified by operation code 432. The field for source vector element ID 434 may further include an identification of a location of the single element of the first vector in accelerator circuit 236, e.g., an address in data memory 316, buffer circuit 318, vector register file 320, or some other location in accelerator circuit 236.

Source vector element ID 436 may include an identification of a position in the second vector for the single element of the second vector used for the vector operation identified by operation code 432. The field for source vector element ID 436 may further include an identification of a location of the single element of the second vector in accelerator circuit 236, e.g., an address in data memory 316, buffer circuit 318, vector register file 320, or some other location in accelerator circuit 236.

Destination vector element ID 438 may include an identification of a position in an output vector for an output element generated as a results of the vector operation identified by operation code 432. The field for destination vector element ID 438 may further include an identification of a storage location in accelerator circuit 236 for the output element, e.g., a location in data memory 316, buffer circuit 318, vector register file 320, or some other location in accelerator circuit 236. Thus, vector circuit 314 may perform a vector operation as identified by operation code 432 on the single element of the first vector as identified by source vector element ID 434 and the single element of the second vector as identified by source vector element ID 436 to generate the single output element of the output vector (e.g., a single element of output vector 324) as identified by destination vector elements IDs 438. Instruction format 430 allows the use of two vectors as scalars, and the vector operation performed at vector circuit 314 as identified by operation code 432 may represent a scalar operation performed on any element of the first vector and any element of the second vector to generate any element of the output vector. Furthermore, the use of instruction format 430 increases a number of scaler registers in accelerator circuit 236.

Example Processes at Vector Circuit

Figure 5:
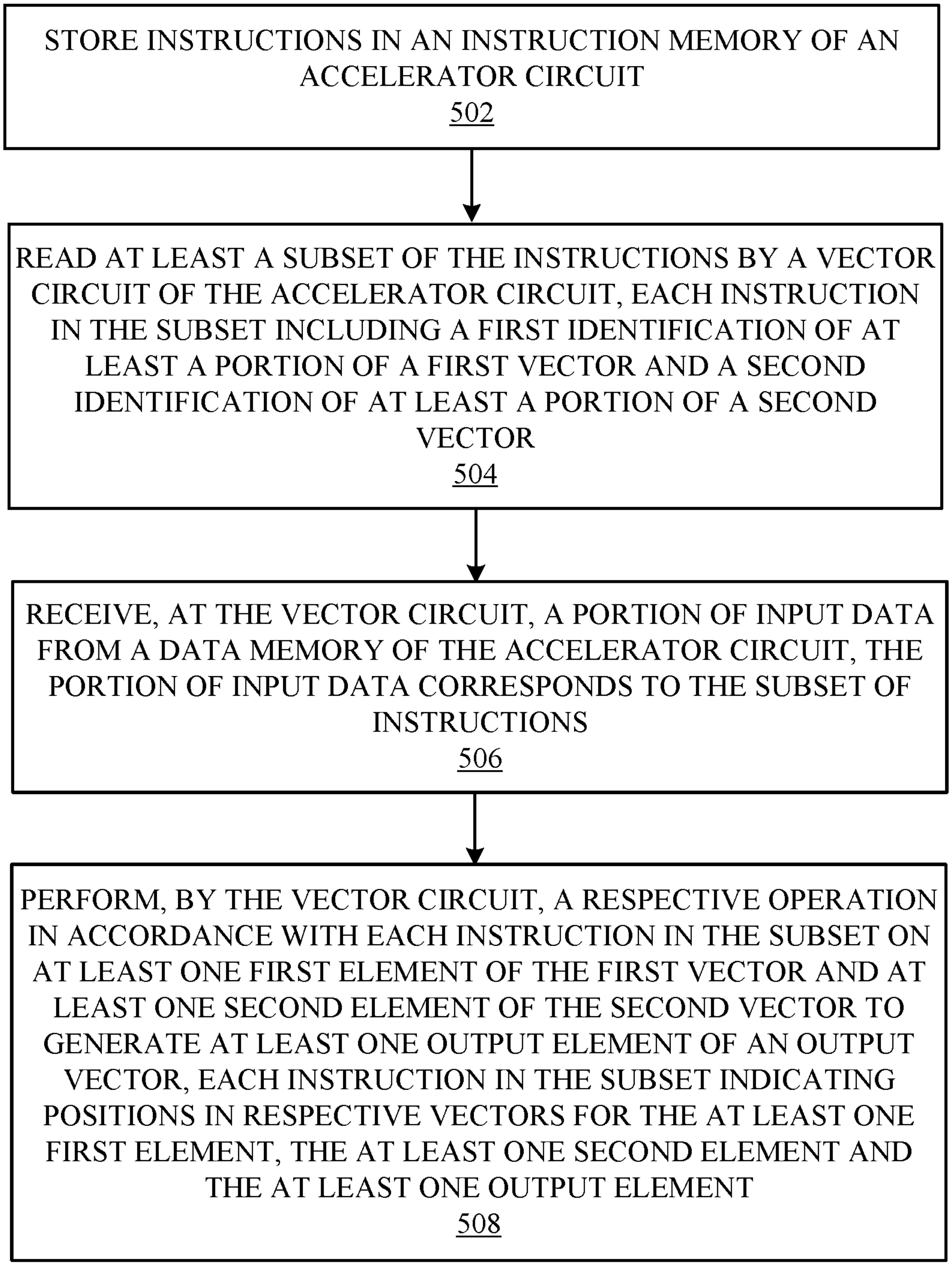
FIG. 5 is a flowchart illustrating a method of performing vector operations at a vector circuit in an accelerator circuit, according to one embodiment.

FIG. 5 is a flowchart illustrating a method of performing vector operations at a vector circuit of an accelerator circuit (e.g., linear algebra accelerator circuit), according to one embodiment. The accelerator circuit stores 502 multiple instructions in an instruction memory of the accelerator circuit.

The accelerator circuit reads 504 at least a subset of the instructions from the instruction memory by a vector circuit of the accelerator circuit coupled to the instruction memory, each instruction in the subset of instructions including a first identification of at least a portion of a first vector and a second identification of at least a portion of a second vector.

The accelerator circuit receives 506, at the vector circuit, at least a portion of the input data from a data memory of the accelerator circuit, the portion of input data corresponds to the subset of instructions. The accelerator circuit may receive the at least one first element and the at least one second element from the data memory at a vector register file of the vector circuit in accordance with each instruction in the subset of instructions.

The accelerator circuit performs 508, by the vector circuit, a respective vector operation in accordance with each instruction in the subset on at least one first element of the first vector and at least one second element of the second vector from the received portion of input data to generate at least one output element of an output vector, each instruction in the subset indicating positions in respective vectors for (i) the at least one first element, (ii) the at least one second element and (iii) the at least one output element. Each instruction in the subset of instructions may indicate at least one position in the first vector for the at least one first element, at least one position in the second vector for the at least one second element, and least one position in the output vector for the at least one output element. The accelerator circuit may store (e.g., via a load and store circuit coupled to the data memory and the vector circuit) the least one output element into the data memory. The accelerator circuit may store the least one output element into the vector register file in accordance with each instruction in the subset of instructions for further use at the vector circuit.

Embodiments of the process as described above with reference to FIG. 5 are merely illustrative. Moreover, sequence of the process may be modified or omitted.

While particular embodiments and applications have been illustrated and described, it is to be understood that the invention is not limited to the precise construction and components disclosed herein and that various modifications, changes and variations which will be apparent to those skilled in the art may be made in the arrangement, operation and details of the method and apparatus disclosed herein without departing from the spirit and scope of the present disclosure.

What is claimed is:

1. An accelerator circuit comprising:
a vector circuit;
an instruction memory;
an align and dispatch circuit configured to:
receive from the instruction memory an instruction packet comprising a plurality of instructions stored in a same address in the instruction memory; and
dispatch a first instruction of the plurality of instructions to a sequencer circuit, or a second instruction of the plurality of instructions to a scalar circuit, or a third instruction of the plurality of instructions to a load and store circuit, or a fourth instruction of the plurality of instructions to the vector circuit, wherein the sequencer circuit, the scalar circuit, the load and store circuit, and the vector circuit are different from the align and dispatch circuit and are coupled to the align and dispatch circuit; and
a data memory to store input data;
wherein the vector circuit is coupled to the instruction memory and the data memory, the vector circuit configured to:
read at least a subset of the instructions of the instruction packet from the align and dispatch circuit that is to receive the instruction packet from the instruction memory, each instruction in the at least the subset of the instructions to include a first identification of at least a portion of a first vector and a second identification of at least a portion of a second vector,
decode each instruction in the at least the subset of the instructions;
receive at least a portion of the input data from the data memory that corresponds to the at least the subset of the instructions, and
perform a respective vector operation in accordance with each decoded instruction of the subset on at least one first element of the first vector and at least one second element of the second vector from the received portion of input data to generate at least one output element of an output vector, each instruction in the subset indicating positions in respective vectors for (i) the at least one first element, (ii) the at least one second element, and (iii) the at least one output element.

2. The accelerator circuit of claim 1, wherein each instruction in the subset indicates at least one position in the first vector for the at least one first element, at least one position in the second vector for the at least one second element, and least one position in the output vector for the at least one output element.

3. The accelerator circuit of claim 1, wherein the vector circuit is further configured to:

perform the respective vector operation on a first plurality of elements of the first vector and a second plurality of elements of the second vector to generate a plurality of output elements of the output vector, wherein each instruction in the subset indicates a plurality of positions in the first vector for the first plurality of elements, a plurality of positions in the second vector for the second plurality of elements, and a plurality of positions in the output vector for the plurality of output elements.

4. The accelerator circuit of claim 1, wherein the vector circuit is further configured to:

perform the respective vector operation on a first plurality of elements of the first vector and a second element of the second vector to generate a plurality of output elements of the output vector, wherein each instruction in the subset indicates a plurality of positions in the first vector for the first plurality of elements, a position in the second vector for the second element, and a plurality of positions in the output vector for the plurality of output elements.

5. The accelerator circuit of claim 1, wherein the vector circuit is further configured to:

perform the respective vector operation on a first element of the first vector and a second element of the second vector to generate an output element of the output vector, wherein each instruction in the subset indicates a position in the first vector for the first element, a position in the second vector for the second element, and a position in the output vector for the output element.

6. The accelerator circuit of claim 1, wherein the vector circuit is further configured to receive the at least one first element and the at least one second element from the data memory at a vector register file of the vector circuit in accordance with each instruction in the subset.

7. The accelerator circuit of claim 6, wherein the vector circuit is further configured to store the least one output element in the vector register file in accordance with each instruction in the subset for further use by the vector circuit.

8. The accelerator circuit of claim 6, further comprising a buffer circuit coupled to the data memory, and the vector circuit is further configured to store the least one output element in the buffer circuit in accordance with each instruction in the subset.

9. The accelerator circuit of claim 7, further comprising the load and store circuit to include the buffer circuit, the load and store circuit configured to store the least one output element from the buffer circuit in the data memory.

10. The accelerator circuit of claim 1, wherein the accelerator circuit is integrated into an image signal processor circuit or a neural processor circuit.

11. A method of operating an accelerator circuit, comprising:

receiving, by an align and dispatch circuit and from an instruction memory, an instruction packet comprising a plurality of instructions stored in a same address in the instruction memory;

dispatching, by the align and dispatch circuit, a first instruction of the plurality of instructions to a sequencer circuit, or a second instruction of the plurality of instructions to a scalar circuit, or a third instruction of the plurality of instructions to a load and store circuit, or a fourth instruction of the plurality of instructions to a vector circuit, wherein the sequencer circuit, the scalar circuit, the load and store circuit, and the vector circuit are different from the align and dispatch circuit and coupled to the align and dispatch circuit;

reading at least a subset of the instructions of the instruction packet from the align and dispatch circuit that is to receive the instruction packet from the instruction memory by the vector circuit of the accelerator circuit coupled to the instruction memory, each instruction in the at least the subset of the instructions is to include a first identification of at least a portion of a first vector and a second identification of at least a portion of a second vector;

receiving, at the vector circuit, at least a portion of the input data from a data memory of the accelerator circuit, the portion of input data corresponds to the at least the subset of the instructions; and performing, by the vector circuit, a respective vector operation in accordance with each instruction of the subset on at least one first element of the first vector and at least one second element of the second vector from the received portion of input data to generate at least one output element of an output vector, each instruction in the subset is to indicate positions in respective vectors for (i) the at least one first element, (ii) the at least one second element, and (iii) the at least one output element.

12. The method of claim 11, wherein each instruction in the subset indicates at least one position in the first vector for the at least one first element, at least one position in the second vector for the at least one second element, and least one position in the output vector for the at least one output element.

13. The method of claim 11, further comprising:

performing, by the vector circuit, the respective vector operation on a first plurality of elements of the first vector and a second plurality of elements of the second vector to generate a plurality of output elements of the output vector, wherein each instruction in the subset indicates a plurality of positions in the first vector for the first plurality of elements, a plurality of positions in the second vector for the second plurality of elements, and a plurality of positions in the output vector for the plurality of output elements.

14. The method of claim 11, further comprising:

performing, by the vector circuit, the respective vector operation on a first plurality of elements of the first vector and a second element of the second vector to generate a plurality of output elements of the output vector, wherein each instruction in the subset indicates a plurality of positions in the first vector for the first plurality of elements, a position in the second vector for the second element, and a plurality of positions in the output vector for the plurality of output elements.

15. The method of claim 11, further comprising:

performing, by the vector circuit, the respective vector operation on a first element of the first vector and a second element of the second vector to generate an output element of the output vector, wherein each instruction in the subset indicates a position in the first vector for the first element, a position in the second vector for the second element, and a position in the output vector for the output element.

16. The method of claim 11, further comprising:

receiving the at least one first element and the at least one second element from the data memory at a vector register file of the vector circuit in accordance with each instruction in the subset.

17. The method of claim 16, further comprising:

storing the least one output element into the vector register file in accordance with each instruction in the subset for further use by the vector circuit.

18. An electronic device, comprising:

a system memory to store input data; and an accelerator circuit coupled to the system memory, the accelerator circuit including:

a vector circuit, a data memory configured to receive and store the input data from the system memory, an instruction memory, an align and dispatch circuit configured to:

receive from the instruction memory an instruction packet comprising a plurality of instructions stored in a same address in the instruction memory; and dispatch a first instruction of the plurality of instructions to a sequencer circuit, or a second instruction of the plurality of instructions to a scalar circuit, or a third instruction of the plurality of instructions to a load and store circuit, or a fourth instruction of the plurality of instructions to the vector circuit, wherein the sequencer circuit, the scalar circuit, the load and store circuit, and the vector circuit are different from the align and dispatch circuit and coupled to the align and dispatch circuit;

wherein the vector circuit is coupled to the instruction memory and the data memory, the vector circuit configured to:

read at least a subset of the instructions of the instruction packet from the align and dispatch circuit that receives the instruction packet from the instruction memory, each instruction in the at least the subset of instructions to include a first identification of at least a portion of a first vector and a second identification of at least a portion of a second vector, decode each instruction in the at least the subset of instructions;

receive at least a portion of the input data from the data memory that corresponds to the at least the subset of instructions, and perform a respective vector operation in accordance with each decoded instruction of the subset on at least one first element of the first vector and at least one second element of the second vector from the received portion of input data to generate at least one output element of an output vector, each instruction in the subset to indicate positions in respective vectors for (i) the at least one first element, (ii) the at least one second element, and (iii) the at least one output element.

19. The electronic device of claim 18, wherein each instruction in the subset indicates at least one position in the first vector for the at least one first element, at least one position in the second vector for the at least one second element, and least one position in the output vector for the at least one output element.

20. The electronic device of claim 18, wherein the vector circuit is further configured to:

perform the respective vector operation on a first plurality of elements of the first vector and a second element of the second vector to generate a plurality of output elements of the output vector, wherein each instruction in the subset indicates a plurality of positions in the first vector for the first plurality of elements, a position in the second vector for the second element, and a plurality of positions in the output vector for the plurality of output elements.

* * * * *